Feb. 14, 1939.  A. C. DAVIS, JR  2,146,799
HAND MEASURING INSTRUMENT
Filed Jan. 14, 1936   4 Sheets-Sheet 1
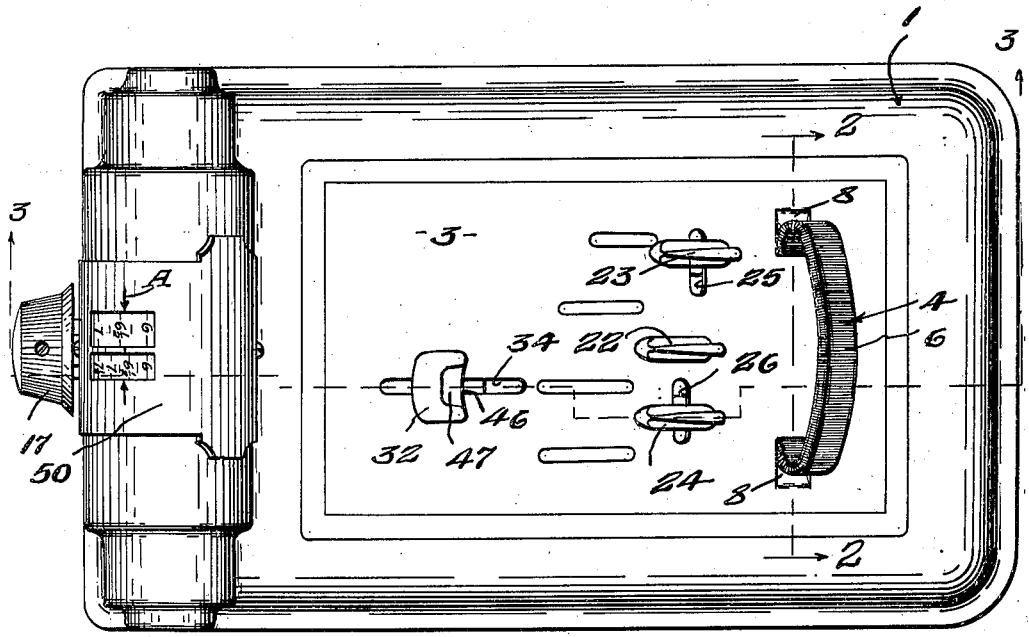
Fig-1-
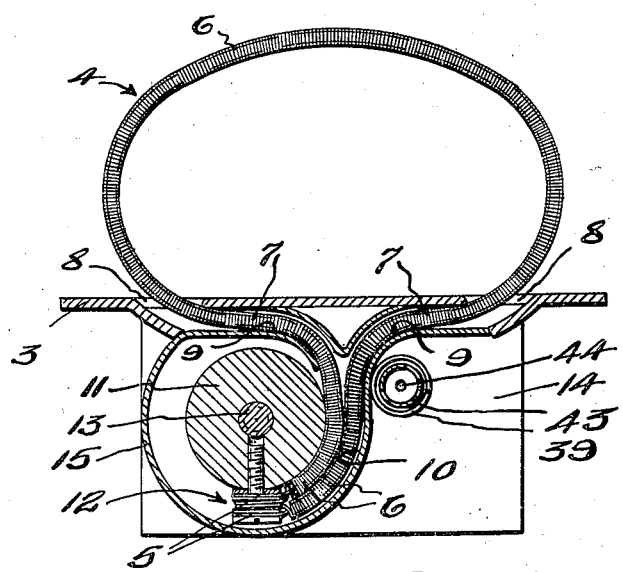
Fig-2-
INVENTOR.
Adam C. Davis Jr
BY Bodell & Thompson
ATTORNEYS Feb. 14, 1939.    A. C. DAVIS, JR    2,146,799
HAND MEASURING INSTRUMENT
Filed Jan. 14, 1936    4 Sheets-Sheet 2
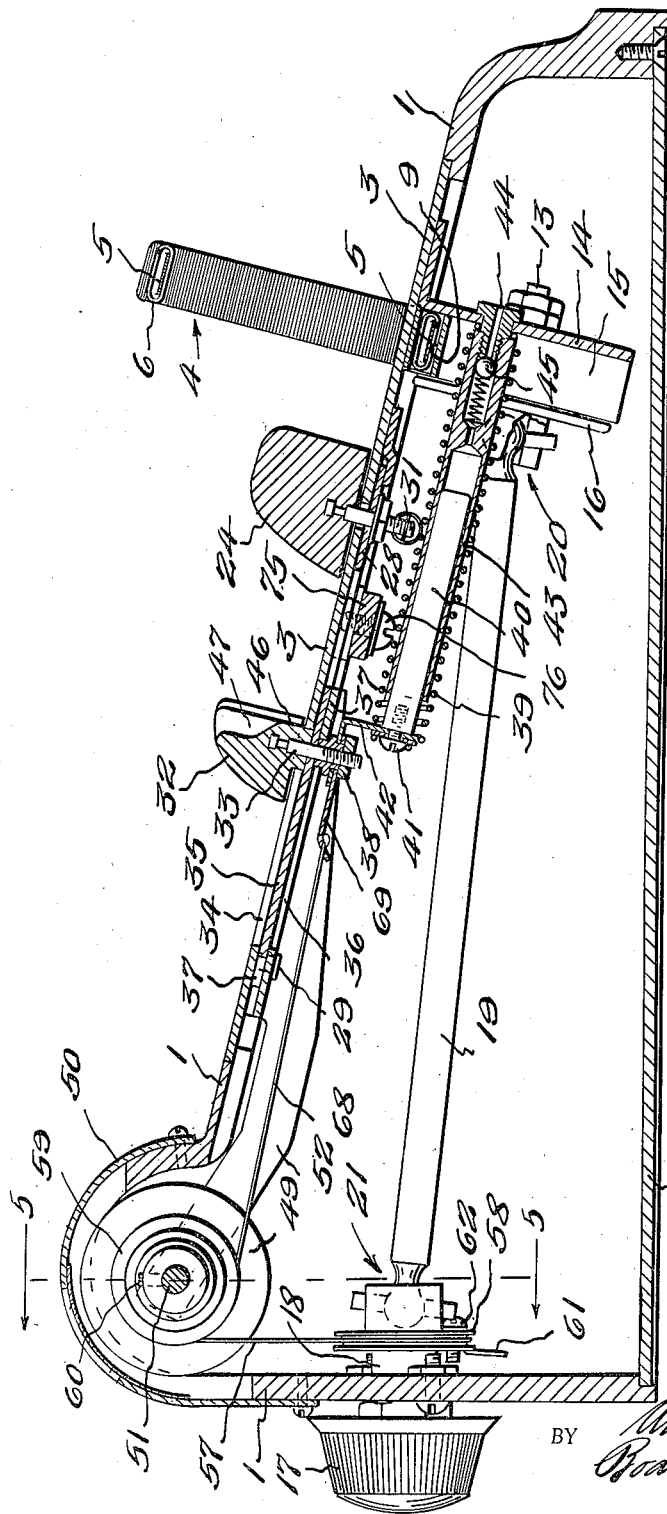
Fig-3-
INVENTOR.
Adair C. Davis Jr
BY
Bodell & Thompson
ATTORNEYS.

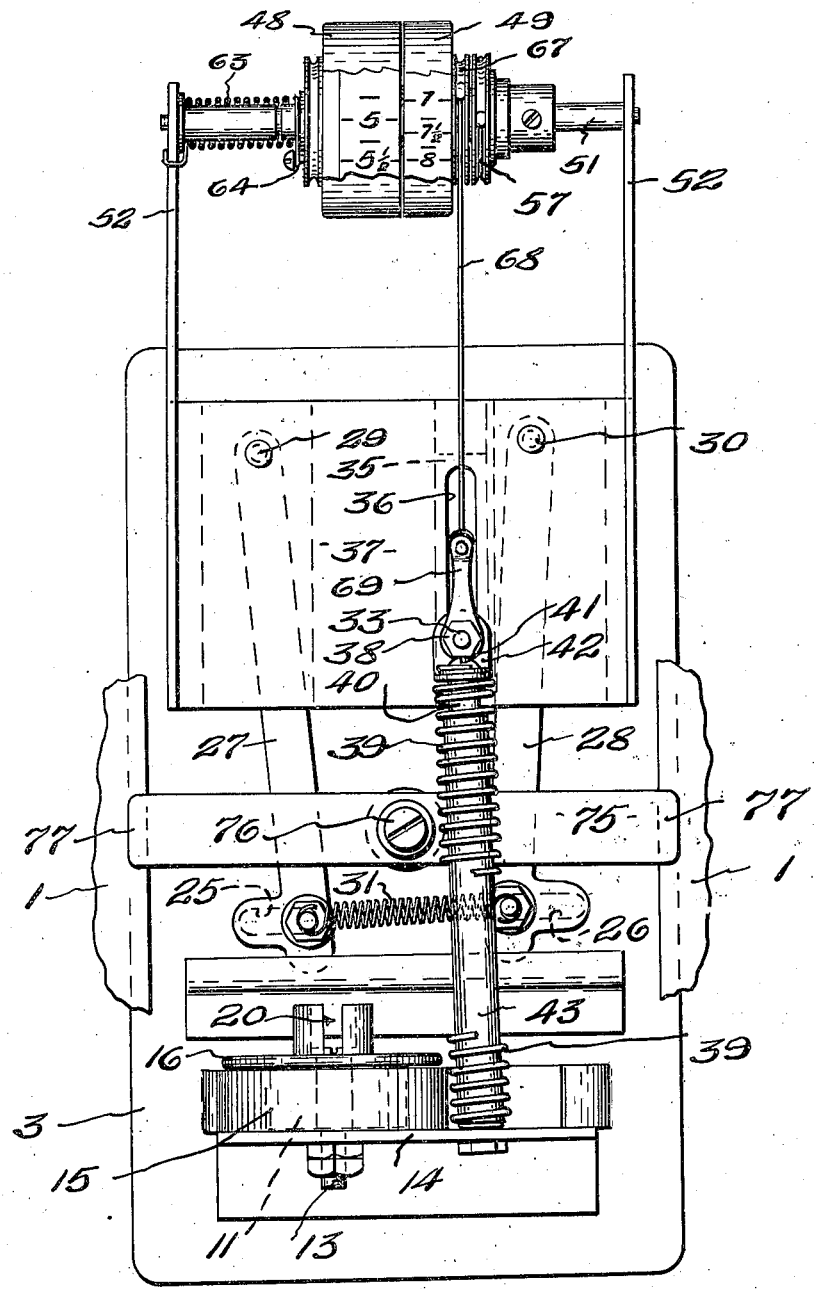

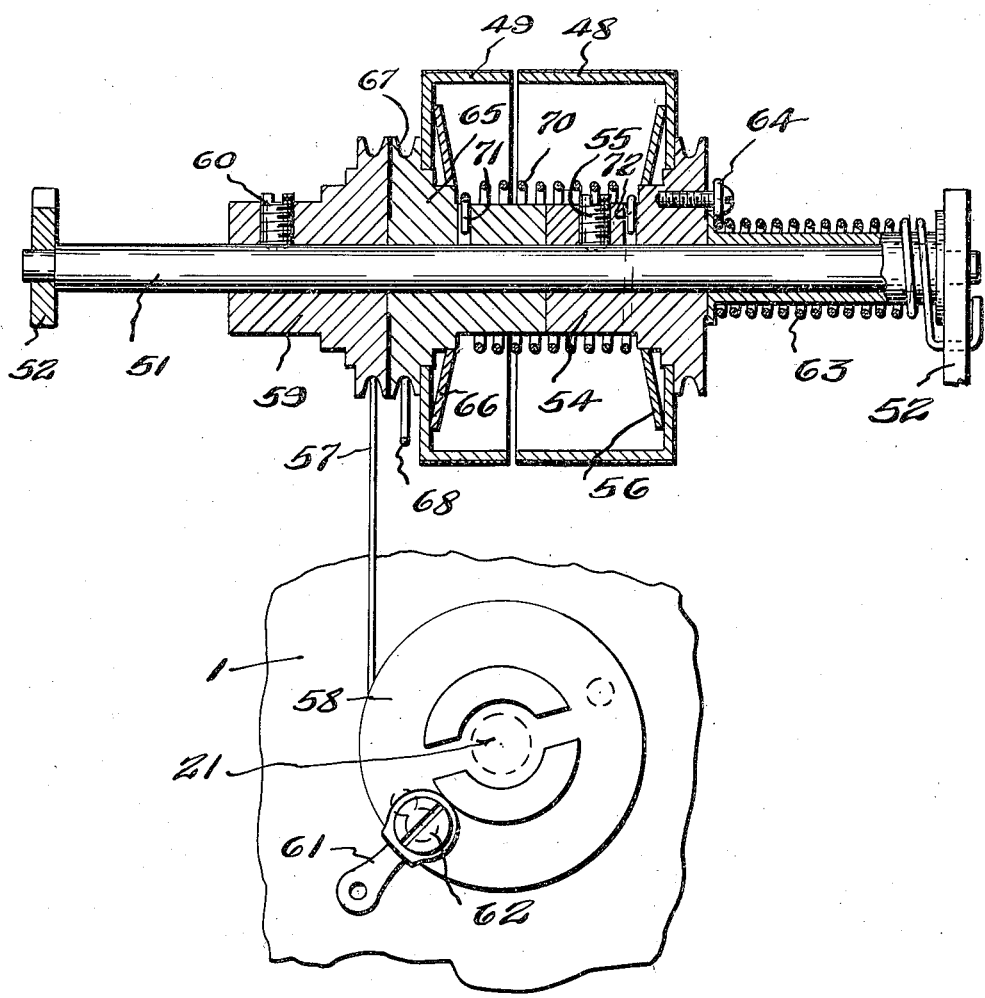

Patented Feb. 14, 1939

2,146,799

UNITED STATES PATENT OFFICE 2,146,799

HAND MEASURING INSTRUMENT

Adam C. Davis, Jr., Ithaca, N. Y., assignor to Gates-Mills Inc., Johnstown, N. Y., a corporation of New York Application January 14, 1936, Serial No. 59,110

8 Claims. (Cl. 33—2)

This invention relates to measuring instruments, particularly hand measuring instruments for determining quickly and accurately the size of the glove required to fit the hand, and in some respects, particularly to hand measuring instruments in which the girth of the hand is measured by a tape in the form of a loop of the type described in the application of Bernard O. Baird, Kenneth H. Bowen, and Adam C. Davis, Jr., Serial Number 759,198, filed December 26, 1934.

It has for its object a particularly simple and efficient means for expanding and contracting the loop to conform to the girth of the hand being measured and including a single rotary member or spool, together with guides which direct the end portions of the tape tangentially relatively to the spool on which the end portions wind when the loop is contracted, one end portion overlying the other.

It has for its object an indicating mechanism for indicating in terms of glove sizes, the size of glove required when the tape is contracted to conform to the girth of the hand being measured, which indicating mechanism also includes features hereinafter set forth.

It further has for its object a finger length indicating means controlled by a finger abutment for indicating in terms of glove sizes, the size of the glove required for a particular finger length of the hand being measured, so that the operator can judge from the reading of the girth indicator and the finger length indicator, the size of glove required, the indicating means including rotatable drums on which the indications are located.

It further has for its object an actuating means for the drum and the girth measuring means.

Other minor objects will appear throughout the specification.

The invention consists in the novel features and in the combinations and constructions hereinafter set forth and claimed.

In describing this invention, reference is had to the accompanying drawings in which like characters designate corresponding parts in all the views.

Figure 1 is a plan view of my hand measuring instrument embodying this invention.

Figure 2 is an enlarged sectional view on line 2—2, Figure 1.

Figure 3 is an enlarged sectional view on line 3—3, Figure 1.

Figure 4 is an inverted plan view, parts being omitted, of the mechanism carried on the under side of the top plate or hand rest plate of the machine.

Figure 5 is an enlarged sectional view on line 5—5, Figure 3.

1 designates a suitable hollow frame or case having its bottom 2 removable. The frame or case 1 also has an opening throughout the greater part of its top which is closed by a removable plate or hand rest 3. The mechanism of this device is supported by or suspended from the plate 3 within the case 1, with the exception of the handle for operating the girth measuring member.

The mechanism for measuring the girth of the hand includes a movable or adjustable member, as a tape, which normally extends in a loop above the hand rest 3 and means for expanding and contracting the loop. 4 designates the tape generally. This, as here shown, is a laminated structure consisting of inner flexible resilient ribbons 5, 5ª, preferably of metal, one overlying the other, and an outer elastic layer or wrapper 6, as a spirally wound wire or a flattened coil spring, that is, a coiled spring oblong in cross section. The tape is thus conformable to the contour of the hand, but at the same time has sufficient rigidity to hold the loop upstanding in a horizontal loop or oblong. The end portions 7 of the loop extend through slots 8 in the hand rest 3 and thence inwardly toward each other through flattened tubular branches 9 of a guide, and thence extend into a third branch 10 forming a continuation of the inner ends of the branches 9, the branch 10 being common to both branches 9. The branch 10 extends in a general tangential direction to a roller on spool 11 on which the end portions of the tape wind, one over the other, as seen in Figure 2. The extreme ends of the tape are anchored to the spool and each end of the elastic sleeve 6 and each end of the ribbon 5 is independently anchored at different levels or at different radial distances to the spool, as shown at 12 (Figure 2).

In the pending application, above referred to, the opposite ends of the loop wind on different spools and/or on spools movable about parallel axes. In this measuring instrument, both end portions of the tape wind on the same spool, one above the other, and the portions of the tape approaching the spool move inwardly or pull inwardly during winding of the spool under the margin of the palm of the hand, due to the branches 9, so that the circumference dependent upon the width and thickness of the hand is measured rather than a measurement based principally upon the width of the hand.

The spool is mounted upon a suitable axle 13 mounted in a bracket 14 depending from the top plate or hand rest 3 and is located within a housing 15 supported by the bracket 14, a portion of which housing forms the tangential branch guide 10. The side of the housing opposite that adjacent the bracket 14 is closed by a disk or head 16 on the spool 11. The spool 11 is turned or operated by means of an operating handle or knob 17 having an axle 18 journalled in one end of the wall of the housing, the axle 18 being connected to the spool 11 by suitable means, here shown as a shaft 19 connected to the spool 11 and axle 18 by universal joints 20 and 21, so that turning of the handle or knob 17 turns the spool in one direction or the other.

On the hand rest are provided a fixed hand locator 22 and laterally shiftable locators 23, 24, the fixed locator 22 being intended to enter between the second and third fingers of the hand. It is fixed to the center of the hand. The abutments 23 and 24 are intended to extend between the third and fourth fingers and between the second and the index fingers. As hands and fingers differ in width, the members 23 and 24 are mounted to shift laterally, and as shown in Figure 4, these members have stems extending through slots 25 and 26 in the hand rest into carriages, as levers 27 and 28 pivoted at 29 and 30 to the under side of the hand rest or top plate 3. A spring 31 connects the ends of the levers remote from their pivotal points. The levers 27 and 28 are as long as possible and extend lengthwise of the under side of the hand rest in order that their free ends may move practically in a straight line, when shifting laterally.

32 designates a finger length abutment, this being located on the hand rest in position to engage the second or longest finger of the hand when the hand is placed on the hand rest within the loop 4 with the thumb outside of the loop. This is slidably mounted and is provided with a stem 33 extending through a slot 34 in the top plate or hand rest through a carriage or slide 35 and through a slot 36 in a second plate 37 secured to the under side of the top plate, and has a head or nut 38 at its lower end. The slide 35 is suitably guided in a passage between the top plate 3 and the plate 37. When the hand is placed through the loop 4 and the fingers in proper relation to the locating member 22 and the laterally shiftable members 23, 24, the second or longest finger of the hand comes in contact with the abutment 32 and pushes the abutment 32 outwardly or to the left (Figures 1 and 2). This movement is against the action of a returning spring 39. As here shown, this is a tension spring, and in order to cushion or prevent a violent return action of the abutment, when the hand is removed, means is provided for cushioning the reaction of the spring 39. This cushioning means is of the air dash pot type and includes a plunger 40 fixed at one end at 41 to a bracket 42 movable with the stem 33 or the slide 35, and movable in a cylinder 43 suported by the bracket 14, the cylinder having an air inlet 44 having a spring-pressed check valve or ball 45 therein. The spring, which is a tension spring, is anchored at its opposite ends to the cylinder or bracket 14 and to the plunger 40 or the bracket 42. As the finger length abutment 32 is moved outwardly, the plunger 40 is also moved outwardly drawing air into the cylinder and also the spring 39 is tensioned. When the abutment is released, as when the hand is removed from the hand rest, the spring reacts, but the movement of the plunger is retarded due to the fact that the air within the cylinder in passing out under the action of the plunger is retarded in its action in leaking past the plunger 40. The plunger 40 is so fitted in the cylinder 43 that even when lubricated, the air will be forced slowly past it under the reaction of the spring 39 when the check valve 45 is seated.

The finger length abutment 32, as here shown, is an abutment surface 46 against which the end of the finger thrusts and a clearance or recess 47 for the finger nail when the hand of the finger is against the abutment 46.

The indicator means operated in synchronism with the tape 4 and with the finger length abutment 32 is supported from the hand rest 3 and includes two drums 48 and 49 mounted side by side or coaxially and have indicating characters on their peripheries readable through sight openings in the frame or case or in a removable cover plate 50. The drums 48 and 49 are here shown as mounted on a shaft 51 journalled in arms or brackets 52 extending forwardly from the base plate 37 secured to the under side of the hand rest or top plate 3 within the case 1, these brackets extending beyond the end of the hand rest plate 3 and upwardly about the plane of the plate 3. The drum 48 includes a suitable hub 54 secured in any suitable manner, as by a set screw 55, to the shaft to rotate therewith, and a head mounted on the hub 54 to rotate therewith. The cylindrical wall of the drum which is carried by the head is provided with a sheet having graduations thereon in glove sizes. The head is secured to the hub 54 in any suitable manner, as by a dished washer 56 sprung on the hub and pressing against the head of the drum. This permits the adjustment of the drum with the calibrations thereon relative to the hub 48 and the proper correlation of the drum with the actuating mechanism and the girth measuring loop.

The motion of the knob or handle 17 is transferred to the shaft through a cord or wire 57 winding at one end on a grooved pulley 58 mounted in the axle 18 of the knob 17 and anchored thereto, and also winding upon a pulley 59 on the shaft 51, the pulley having a hub secured to the shaft, as by set screw 60 (Figure 5). The cord 57, which is usually a wire, is soldered or otherwise secured to a clip 61 which is turn is secured to the pulley 58 as by a screw 62. The clip is angular or bent so that the point thereof to which the wire 57 is attached lies in the bottom of the groove of the pulley. The end of the wire secured to the pulley 59 is secured in any suitable manner, as by soldering.

The shaft 19 constitutes motion transmitting means between the knob 17 and the spool 11 and the wire and pulley motion transmitting means between the operating member 17 and the indicating drum 48. Obviously, on turning the knob to the right, or, in such a direction as to actuate the spool 11 to wind the end portions of the tape on the spool, the pulley 58 will be turned to wind the wire 57 thereon, and thus turn the pulley 59, the shaft 51 and hence the drum 48 in an anti-clockwise direction or the drum will be turned in synchronism with the spool 11 which operates the girth measuring tape 4, bringing a glove size indication to the sight opening, that indication readable through the sight opening or at the reading line, when the tape is tightened on the hand, indicates the glove size for that particular girth measurement. This turning of the drum 48 in an anti-clockwise direction is against the action of a returning spring 63 anchored at one end to a bracket arm 52 and at its other end at 64 to the drum 48 or the hub thereof. Thus, when the knob is turned in the opposite direction, the spring 63 is free to react and return the drum 48 to its starting position. This spring also effects another result, as will be hereinafter described.

The drum 49 for indicating the finger length is constructed in the same manner as the drum 48, it having a hub 65 similar to the hub 54 of the drum 48 but the hub 54 is mounted to rotate about the shaft 51. The hub 65 is secured to the head of the drum 49 by a spring washer 66 similar to the washer 56. These washers 56 and 66 constitute a convenient means for assembling the head of the drum to the head and providing for the adjustments of the calibrated drums 48, 49 circumferentially relatively to the hubs 54, 65. The hub 65 is formed with a grooved pulley 67 on which winds cord or wire 68 which is connected by means of a clip 69 to the stem 33 of the finger length abutment 32. A torsion spring 70 surrounds the hubs 65 and 54 and is anchored at 71 and 72 thereof. This spring is normally under tension tending to turn the drum 49 in a clockwise direction from starting position and is of less strength than the spring 39 acting to pull the finger abutment 32 toward the end of the finger or toward the lower portion of the hand rest.

In operation, the operator first places his hand on the hand rest with the second or longest finger coming against the abutment 32 and pushing it outwardly or to the left (Figure 3). This movement moves the plunger 40 outward relatively to the cylinder 43 and tensions the spring 39. While the abutment 32 is thus moving outwardly, the spring 70 is free to react and turn the drum 49 in a clockwise direction, bringing the indication corresponding to the finger length to the sight opening or reading line. The spring 63 is strong enough to hold the drum 48 from turning under the action of the spring 70. Thereafter, the knob 17 is actuated, as before described, to tighten the tape 4 onto the hand, but the spring 70 always retains enough resistance to hold the drum 48 from retrograde movement or from movement out of the position in which it is set. When the hand is removed from the hand rest, the spring 39 permits the dash pot consisting of the plunger 40 and cylinder 43 to react slowly, thus returning the finger length abutment 32, and the spring 70 to react to return the finger length indicating drum 49 to its starting position. Also, when the hand is removed, the restraining effect on the drum 48 is removed, so that the spring 63 reacts to return the drum to starting position and tends to return the girth indicating drum 48. However, the return of this drum 48 would be retarded or stopped by the fact that there is nothing to actuate the knob 17 or shaft 19, except the hand of the operator. However, the pull of the wire 57, owing to the reaction of the spring 63 and also the tendency of the resilient tape 4 to expand tends to turn the shaft 19 and the knob 17 in a retrograde direction and overcome the friction of the tape 4 on its guides 7. If it does not turn, and the loop remains in contracted position, then when a customer starts to put his hand in the contracted loop and gives a starting impulse, the loop will open up, thus avoiding damage to the loop by a customer trying to crowd his hand through a small contracted loop. This opening up effect is due to the natural resiliency of the tape 4 and due to the fact that there is a certain amount of pull on the wire 57 due to the reaction of the spring 63.

In measuring a hand, assume that the finger length abutment causes the drum 49 to indicate 6 at the reading line A and the tightening of the girth measuring loop 4 causes the drum 48 to indicate 6½, then the clerk supplies the customer with glove size 6½ with short fingers or 6¼ with medium length fingers. If on the other hand, both readings are the same, 6, the clerk supplies the customer with the size 6 medium glove. If the girth reading indicates size 6 and the finger length reading 6½, a size 6 glove is provided with long fingers.

Different makes of gloves vary somewhat in given sizes and the glove clerk familiar with the different makes uses to some extent his knowledge of furnishing the gloves from the readings of the drums 48, 49.

It will be seen that all working parts are suspended from the hand rest plate 3, except the handle 17 and axle 18 and one end of the shaft 19. Hence, all the working parts can be assembled on the top plate 3 and the top plate located on the case 1. Then the shaft 19 is coupled to the axle 18. The top plate 3 is then held in position by a cross bar 75 detachably secured to the top plate by a screw 76 at the center thereof. The ends of the cross bar extend or hook under the margins of the wall at 77 in the case around the opening closed by the top plate 3.

What I claim is:—

1. In a hand measuring instrument, a flexible conformable tape, means for holding the intermediate portion of the tape in the form of a loop oblong in general form with the end portions of the loop extending inwardly along one side of the oblong formation, and a single spool on which wind the end portions of the tape, said end portions winding on the spool one over the other, and means for operating the spool.

2. In a hand measuring instrument, a flexible conformable tape, means for holding the intermediate portion of the tape in the form of a loop oblong in general form with the end portions of the loop extending inwardly along one side of the oblong formation, and a single spool on which wind the end portions of the tape, said end portions winding on the spool one over the other, means for operating the spool, and a guide in which the end portions of the tape slidably fit including branches extending inwardly toward each other along one side of the oblong formation and individual to the end portions, and a third branch common to the former branches and forming a continuation thereof substantially tangential to the spool.

3. In a hand measuring instrument, a suitable case having a hand rest on the top thereof, a spool mounted in the case below the hand rest, a flexible conformable tape constructed to take the form of an oblong loop having its opposite end portions on one side of the oblong formation extending in a general direction parallel to the hand rest and extending through the hand rest, and a guide including inwardly extending branches in which said end portions slidably fit one in each, and a third branch forming an extension of the former guides and arranged substantially tangential to the spool, the end portions winding on the spool being movable into the third branch from the former branches and one end portion winding over the other about the spool, and means for turning the spool.

4. In a hand measuring instrument, a suitable case having a hand rest on the top thereof, a spool mounted in the case below the hand rest, a flexible conformable tape constructed to take the form of an oblong loop having its opposite end portions on one side of the oblong formation extending in a general direction parallel to the hand rest and extending through the hand rest, and a guide including inwardly extending branches in which said end portions slidably fit one in each, and a third branch forming an extension of the former guides and arranged substantially tangential to the spool, the end portions winding on the spool being movable into the third branch from the former branches, one end portion winding over the other about the spool, means for turning the spool, the tape including an inner metal ribbon and an outer elastic sleeve wrapper, and means for anchoring the ends of the ribbon and the ends of the wrapper different radial distances one above the other from the axis of the spool.

5. In a hand measuring instrument, a suitable case having a hand rest on the top thereof, means for measuring and indicating the girth of the hand, means for operating the girth measuring and indicating means, the measuring and indicating means including a resilient expansible girth member, a rotatable drum having indicating characters thereon, motion transmitting means between the drum and the operating means to turn the drum in synchronism with the movement of the resilient girth member, and a returning spring acting on the drum in opposition to the operating means, the motion transmitting means between the operating means and the drum including a flexible member under tension by the operating means when said means is operated and under tension by the reaction of the returning means when the operating means is released.

6. In a hand measuring instrument, a suitable case having a hand rest thereon, a movable finger abutment operable by a finger of the hand on the hand rest, a finger length indicating means operated by said abutment, a spring acting on the finger length abutment tending to return it from its operated position, a spring acting on the finger length indicating means tending to move it in accordance with the advance movement of the abutment, the spring acting on the abutment being stronger than the spring operating the indicating means.

7. In a hand measuring instrument, a suitable case having a hand rest thereon, a movable finger abutment operable by a finger of the hand on the hand rest, a finger length indicating means operated by said abutment, a spring acting on the finger length abutment tending to return it from its operated position, a spring acting on the finger length indicating means tending to move it in accordance with the advance movement of the abutment, the spring acting on the abutment being stronger than the spring operating the indicating means, and means for retarding the return of the abutment from its operated position.

8. In a hand measuring instrument, a suitable case having a hand rest, a flexible conformable tape projecting in a loop above the hand rest and having its ends extending through the hand rest, and a single spool on which winds the opposite end portions of the tape, one over the other, and means for turning the spool.

ADAM C. DAVIS, Jr.